United States Patent
Jung et al.

(10) Patent No.: US 9,467,812 B2
(45) Date of Patent: Oct. 11, 2016

(54) MOBILE TERMINAL AND METHOD FOR CONTROLLING THE SAME

(71) Applicant: LG ELECTRONICS INC., Seoul (KR)

(72) Inventors: Seyoon Jung, Seoul (KR); Jinho Choo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/441,830

(22) PCT Filed: Apr. 22, 2014

(86) PCT No.: PCT/KR2014/003503
§ 371 (c)(1),
(2) Date: May 8, 2015

(87) PCT Pub. No.: WO2015/023044
PCT Pub. Date: Feb. 19, 2015

(65) Prior Publication Data
US 2015/0289104 A1 Oct. 8, 2015

(30) Foreign Application Priority Data
Aug. 16, 2013 (KR) .......................... 10-2013-0097064

(51) Int. Cl.
*H04W 4/02* (2009.01)
*G06T 3/40* (2006.01)
(Continued)

(52) U.S. Cl.
CPC ........ *H04W 4/025* (2013.01); *G06F 17/30265* (2013.01); *G06T 3/40* (2013.01);
(Continued)

(58) Field of Classification Search
CPC ........ H04W 4/025; G06T 3/40; H04L 67/18; H04N 5/23293; H04N 5/23216
USPC ....................... 455/456.1–457, 566
See application file for complete search history.

(56) References Cited

U.S. PATENT DOCUMENTS 8,164,442 B2 *  4/2012  Ungari .................. G09B 29/10
                                                  340/539.13
8,312,660 B1 *  11/2012 Fujisaki ................. F41A 17/08
                                                  42/70.01
(Continued)

FOREIGN PATENT DOCUMENTS

KR  10-2009-0067558  6/2009
KR  10-2012-0058270  6/2012
(Continued)

OTHER PUBLICATIONS

PCT International Application No. PCT/KR2014/003503, Written Opinion of The International Searching Authority dated Aug. 5, 2014, 9 pages.

*Primary Examiner* — Sharad Rampuria
(74) *Attorney, Agent, or Firm* — Lee, Hong, Degerman, Kang & Waimey; Jonathan Kang; Harry Lee

(57) ABSTRACT

A mobile terminal utilizing location information and a method of controlling therefor are disclosed. A mobile terminal according to one embodiment includes a memory configured to store map information, a camera configured to capture a first image, a position-location module configured to obtain location information when the first image is captured, a display and when the obtained first image is displayed in the display with a magnification satisfying a first condition, if a first command for changing the magnification of the first image is detected, a controller configured to control the display to display a map of a first range containing a point corresponding to the obtained location information.

20 Claims, 15 Drawing Sheets

(51) Int. Cl.
*H04L 29/08* (2006.01)
*H04N 5/232* (2006.01)
*G06F 17/30* (2006.01)
*G06F 3/14* (2006.01)
*H04M 1/725* (2006.01)
*G09G 5/377* (2006.01)

(52) U.S. Cl.
CPC ......... *H04L 67/18* (2013.01); *H04N 5/23216* (2013.01); *H04N 5/23293* (2013.01); *H04W 4/02* (2013.01); *G06F 3/14* (2013.01); *G09G 5/377* (2013.01); *G09G 2370/022* (2013.01); *G09G 2370/04* (2013.01); *H04M 1/72572* (2013.01); *H04M 2250/52* (2013.01)

(56) References Cited

U.S. PATENT DOCUMENTS

| | | | |
|---|---|---|---|
| 8,478,347 B2* | 7/2013 | Kim | H04N 5/23216 455/566 |
| 2010/0271399 A1* | 10/2010 | Shiu | G06T 3/0012 345/660 |
| 2011/0159885 A1* | 6/2011 | Song | G09B 29/10 455/456.1 |
| 2012/0208551 A1 | 8/2012 | Hill | |
| 2013/0249952 A1* | 9/2013 | Kusakabe | G06T 3/40 345/671 |

FOREIGN PATENT DOCUMENTS

| KR | 10-2013-0066336 | 6/2013 |
|---|---|---|
| KR | 10-2013-0076926 | 7/2013 |

\* cited by examiner

MOBILE TERMINAL AND METHOD FOR CONTROLLING THE SAME

CROSS-REFERENCE TO RELATED APPLICATIONS

This application is the National Stage filing under 35 U.S.C. 371 of International Application No. PCT/KR2014/003503, filed on Apr. 22, 2014, which claims the benefit of earlier filing date and right to Korean Application No. 10-2013-0097064, filed on Aug. 16, 2013, the contents of which are all hereby incorporated by reference herein in their entirety.

TECHNICAL FIELD

The present invention relates to a mobile terminal and an apparatus therefor enabling a user to more conveniently use the mobile terminal.

BACKGROUND ART

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, a mobile terminal equipped with such a position-location module as a GPS module is widely disseminating.

A user of the mobile terminal can recognize a current position of the user via the position-location module. In case that the user has captured photos using a camera, the user can store locations where the photos are captured as well as the photos.

Yet, when the locations of the photos are stored together with the photos, the user should enter such a menu as attribute information of the photos and the like one by one to check the locations of the photos. It is inconvenient for the user to use the mobile terminal and difficult to intuitively check the locations of the photos or the current position of the user.

DISCLOSURE OF INVENTION

Technical Problem

One technical task that one embodiment of the present invention intends to achieve is to provide a mobile terminal capable of easily checking a location where a photo is taken via an intuitive action of a user.

Another technical task that one embodiment of the present invention intends to achieve is to provide a mobile terminal capable of taking a picture in a virtual place.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

To achieve these and other advantages and in accordance with the purpose of the present invention, as embodied and broadly described, according to one embodiment, a mobile terminal includes a memory configured to store map information, a camera configured to capture a first image, a position-location module configured to obtain location information when the first image is captured, a display and when the obtained first image is displayed in the display with a magnification satisfying a first condition, if a first command for changing the magnification of the first image is detected, a controller configured to control the display to display a map of a first range including a point corresponding to the obtained location information.

To further achieve these and other advantages and in accordance with the purpose of the present invention, according to a different embodiment, a mobile terminal includes a memory configured to store map information including a road view image, a camera configured to capture a first image, a position-location module configured to obtain location information when the first image is captured, a display configured to display the captured first image and if a first command is detected, a controller configured to extract an object from the first image and display a road view image corresponding to the obtained location information and the extracted object.

It is to be understood that both the foregoing general description and the following detailed description are exemplary and explanatory and are intended to provide further explanation of the invention as claimed.

ADVANTAGEOUS EFFECTS OF INVENTION

According to one embodiment, a mobile terminal can check a location where a photo is taken via an intuitive action of a user, thereby enhancing user convenience.

According to one embodiment, a mobile terminal can provide a solution capable of taking a picture in a virtual place.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF DRAWINGS

The above and other aspects, features, and advantages of the present invention will become more apparent upon consideration of the following description of preferred embodiments, taken in conjunction with the accompanying drawing figures.

BEST MODE FOR CARRYING OUT THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
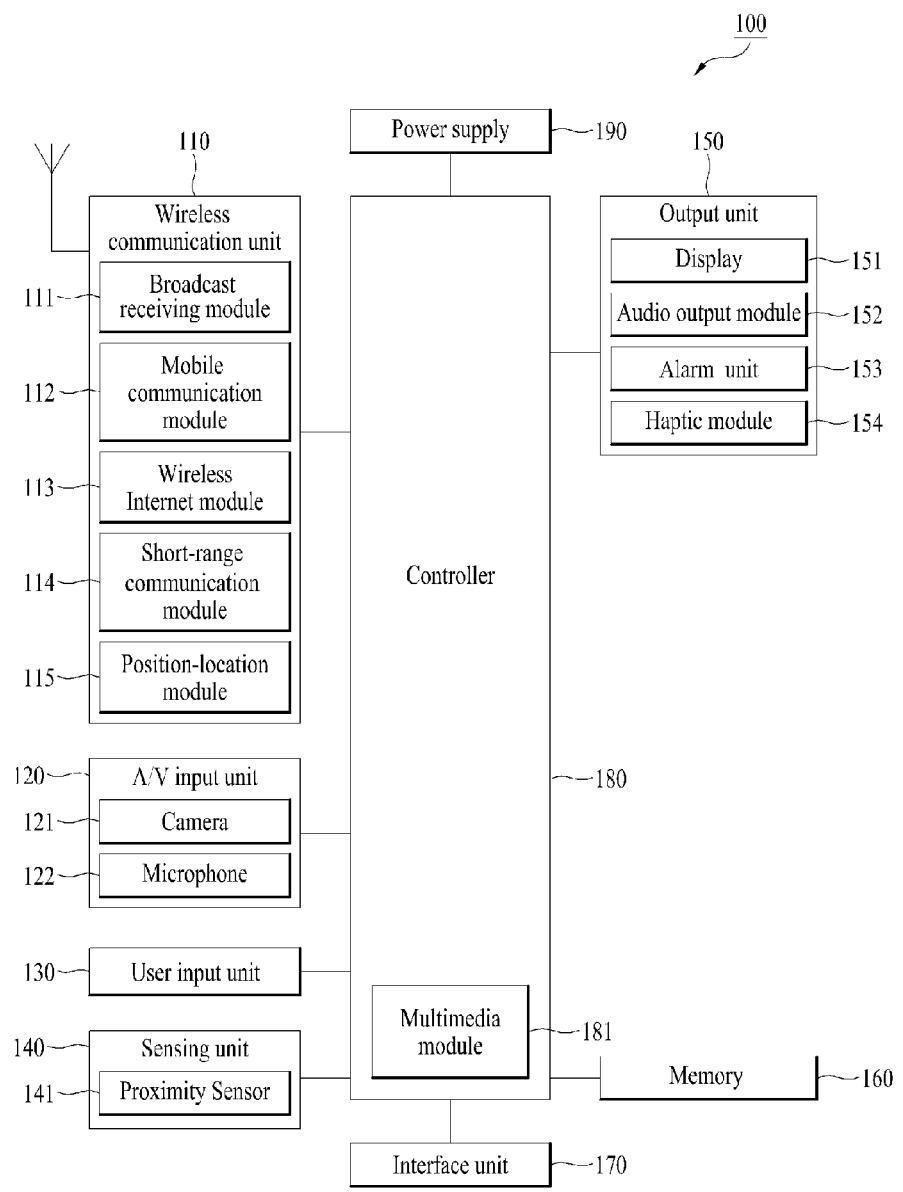
FIG. 1 is a block diagram of a mobile terminal in accordance with an embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-minor device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
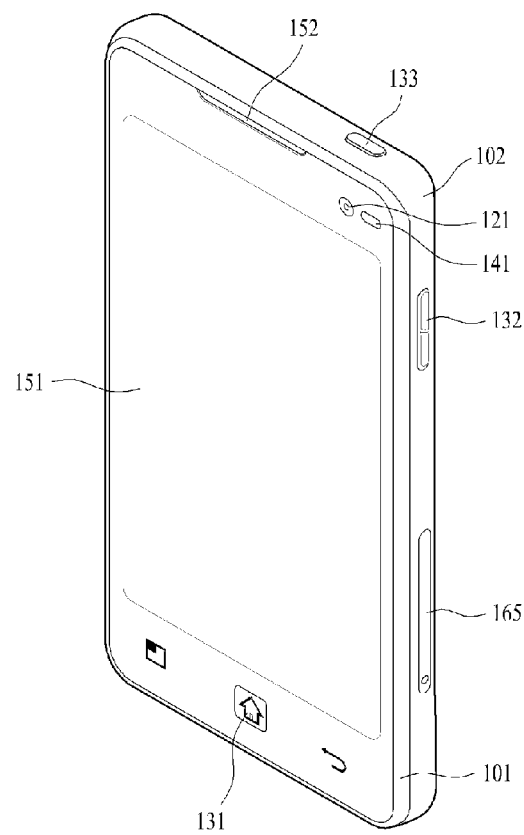
FIG. 2 is a front perspective diagram of a mobile terminal according to one embodiment of the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 3:
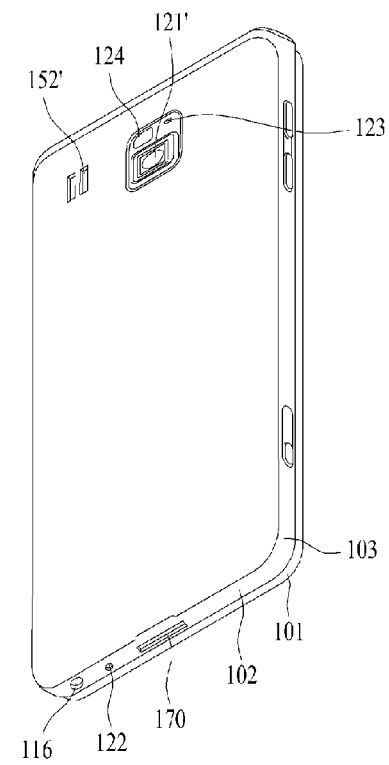
FIG. 3 is a perspective diagram of a backside of the mobile terminal shown in FIG. 2.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad for detecting a touch can be additionally provided to the rear case 102. The touchpad can be configured in a light transmittive type like the display 151. In this case, if the display 151 is configured to output visual information from its both faces, it is able to recognize the visual information via the touchpad as well. The information outputted from both of the faces can be entirely controlled by the touchpad. Alternatively, a display is further provided to the touchpad so that a touchscreen can be provided to the rear case 102 as well.

The touchpad is activated by interconnecting with the display 151 of the front case 101. The touchpad can be provided in rear of the display 151 in parallel. The touchpad can have a size equal to or smaller than that of the display 151.

It is preferable that the mobile terminal according to one embodiment of the present invention includes a position-location module 115, a camera 121, a controller 180, a display 151, and a memory 160. Yet, since this sort of configurations is not mandatory, it is apparent to those having ordinary skill in the art that at least a part of the aforementioned components can be omitted.

Configuration modules of the mobile terminal 100 are explained in relation to embodiment of the present invention in the following.

The memory 160 stores map information. The memory may store a map associated program or an application received from an external server via a mobile communication module 112 or a wireless internet module 113. The map information stored in the memory 160 may be updated periodically or according to a user selection. In some cases, the map information may include a road view image. In particular, the map information may further include a road view image corresponding to an image in which an actual road is taken as well as a general map image displaying a part or a whole of the surface of earth using a sign or a character by scaling it down with a prescribed ratio.

The position-location module 115 obtains location information of the mobile terminal 100 when an image is taken by the camera 121. As an example, the position-location module 115 may correspond to a GPS module and the location information may correspond to a GPS latitude/longitude coordinate.

The memory 160 stores the location information of the mobile terminal 100 obtained by the position-location module 115.

The display 151 displays an image taken by the camera 121. For clarity, the image is called a first image.

When the first image is displayed in the display 151 with a magnification satisfying a first condition, if a first command is detected, the controller 180 controls the display 151 to display a map of a first range. The map of the first range includes a point corresponding to the location information of the mobile terminal 100 obtained by the position-location module 115 when the first image is taken by the camera 121. If the first command is detected, the controller 180 accesses the memory 160 and can extract the map of the first range from the map information stored in the memory 160.

The magnification satisfying the first condition may include a predetermined lowest magnification of the first image or a magnification capable of displaying the whole of the first image in an area in which the first image is displayable in the display 151. For instance, the magnification satisfying the first condition may correspond to a condition for displaying the first image in the display 151 in an original size or a condition for displaying the first image in the display 151 in a manner of reducing the first image to the max.

In this case, when a specific image is displayed in the display 151, a magnification indicates a ratio between the displayed specific image and an original of the specific image in size. For instance, if the magnification is 100%, the specific image is displayed in the display 151 in the original size of the specific image as it is, if the magnification is lower than 100%, the specific image is displayed in the display 151 in a manner of being reduced from the original size of the specific image, if the magnification is higher than 100%, the specific image is display in the display 151 in a manner of being magnified from the original size of the specific image. If the magnification is lower or equals to 100%, the whole of the specific image is displayed in an area in which the specific image is displayable in the display 151. Yet, if the magnification is higher than 100%, a part of the specific image is displayed only in the area in which the specific image is displayable in the display 151.

The first command is inputted via the user input unit 130. If the display 150 includes a touch screen, the first command can be inputted via the display 150 playing a role of the user input unit 130.

The first command may be used for changing a magnification of the first image. For instance, the first command may be used for reducing the magnification of the first image. As an example, the first command may correspond to a zoom-out command of the first image.

The display 151 may display the map of the first range and the first image together. In this case, the first image is displayed in a state that the magnification is changed in response to the first command. It is preferable that the first image is displayed in a manner that a magnification is reduced.

When the map of the first range is displayed in the display 151, if a second command is detected, the controller 180 controls the display to display a map of a second range. The map of the second range includes a point corresponding to the location information of the mobile terminal 100 obtained by the position-location module 115 when the first image is taken by the camera 121. If the second command is detected, the controller 180 accesses the memory 160 and can extract the map of the second range from the map information stored in the memory 160.

The second command is inputted via the user input unit 130. If the display 150 includes a touch screen, the second command can be inputted via the display 150 playing a role of the user input unit 130.

The second command may be used for changing a magnification of the displayed map of the first range or a scale of the displayed map of the first range. For instance, the second command may be used for reducing the magnification of the displayed map of the first range or the scale of the displayed map of the first range. As an example, the second command may correspond to a zoom-out command of the map of the first range. Yet, according to embodiment, when a screen of the display 151 is switched to the map of the second range from the map of the first range by the second command, if the second command is used to change the magnification of the map of the first range, it is possible to implement the mobile terminal 100 to directly switch to the screen of the map of the second range without changing the magnification of the map of the first range. In particular, according to embodiment, the second command corresponds to a command used for changing the magnification of the map of the first range only. The magnification of the map of the first range may not be actually reduced by the second command.

The map of the first range is bigger than the map of the second range in scale. Hence, the map of the first range displays a relatively small area in a manner of displaying it relatively big and the map of the second range displays a relatively wide area in a manner of displaying it relatively small. The scale of the map of the first range and the scale of the map of the second range may be determined in advance.

The display 151 can display the map of the second range and the first image together. In this case, it is preferable that the first image is displayed in a manner that a magnification of the first image is reduced.

The controller 180 can control the display 151 to display an indicator indicating a point corresponding to the obtained location information of the mobile terminal 100 on the map of the first range or the map of the second range. A user can easily check a location in which a picture was taken on a map in a manner of simply inputting a command for changing a magnification of the picture (e.g., the first image) or the map (e.g., the map of the first range).

According to embodiment, the first image may correspond to a preview image. In particular, the first image may correspond to the preview image obtained by the camera 121 before a picture capturing command is inputted.

When the first image is displayed in the display 151 with a magnification satisfying a second condition, if a third command is detected, the controller 180 can control the display 151 to display information on the first image.

The magnification satisfying the second condition may include a predetermined highest magnification of the first image or a magnification capable of displaying a smallest area of the first image in an area in which the first image is displayable in the display 151. For instance, the magnification satisfying the second condition may correspond to a condition for displaying the first image in the display 151 in a manner of magnifying the first image to the max.

The third command is inputted via the user input unit 130. If the display 150 includes a touch screen, the third command can be inputted via the display 150 playing a role of the user input unit 130.

The third command may be used for changing a magnification of the first image. As an example, the third command may correspond to a zoom-in command of the first image.

If the first image corresponds to an image captured by the camera 121 and stored in the memory 160 in a file form, the information on the first image may correspond to attribute information of the image. For instance, if the first image corresponds to an image obtained by a picture capturing command, the information on the first image may include a title of the first image, a time/location in which the first image is captured, a size of the first image in width and the like, a file size of the first image, a storage route of the first image, and the like. On the contrary, if the first image corresponds to a preview image, the information on the first image may correspond to configuration information of the camera 121 when the first image is captured. For instance, if the first image corresponds to the preview image, the information on the first image may include an exposure value of the camera 121, whether a timer is set, whether a flash is set, a capturing mode, a white balance configuration value, and the like.

The memory 160 stores location information of the mobile terminal 100 when a plurality of pre-obtained images or each of a plurality of the pre-obtained images is captured. The memory 160 can store the location information of the mobile terminal 100 in a manner of matching the information with each of a plurality of the images.

If the first command is detected, the controller 180 controls the display 151 to display at least one indicator indicating each of points included in the map of the first range among points corresponding to the location information stored in the memory in a manner of being matched with a plurality of the pre-obtained images, respectively.

For instance, if there are 10 images stored in the memory 160 and 4 of the 10 images are captured in a position which is included in the map of the first range, the controller 180 controls the display 151 to display 4 indicators when the map of the first range is displayed. Of course, the controller 180 displays an indicator indicating a point in which the first image is captured as well as the 4 indicators indicating points in which the 4 images pre-stored in the memory 160 are captured in the map of the first range. By doing so, a user can simultaneously check the position in which the first image is captured and positions in which different images are captured which are adjacent to the position in which the first image is captured, thereby enhancing user convenience.

The controller 180 can control the display 151 to display images respectively corresponding to the points indicated by the indicators, which are displayed in the map of the first range, among a plurality of the pre-obtained images and the first image. According to embodiment, the controller 180 can display each of the images in a thumbnail form or a slideshow form.

As mentioned in the foregoing description, in case that there exist a plurality of pre-obtained images, an example of displaying indicators in the map of the first range or displaying images captured in the points indicated by the indicators is explained. Yet, if a second command is detected in the state that there exist a plurality of the pre-obtained images, an embodiment of displaying an indicator in the map of the second range or displaying the images captured in the points indicated by the indicators is also possible. Since detailed explanation on this is duplicated with the aforementioned description, it is omitted at this time.

According to embodiment, the controller 180 can control the display 151 to extract an object from the first image and display a road view image corresponding to location information of the mobile terminal 100 when the first image is captured as well as the extracted object. The object may correspond to a person becoming a capturing target. However, the object is not necessarily to be a person. The object may correspond to a specific thing carried by the person, a specific object connected with the person, or the like.

The memory 160 may store an algorithm or a program used for extracting an object from an image captured by the camera 121 in advance.

If a command for selecting a road view image of a specific direction from the displayed road view image is detected, the controller 180 can control the display 151 to display the object in a manner of overlaying the object with the road view image of the specific road view image.

In the following, embodiments of the present invention are explained in detail with reference to attached drawings.

According to the present invention, it is able to intuitively check a position in which a preview image or an image stored in the memory is captured. Regarding this, it shall be explained with reference to FIG. 4 to FIG. 7.

Figure 4:
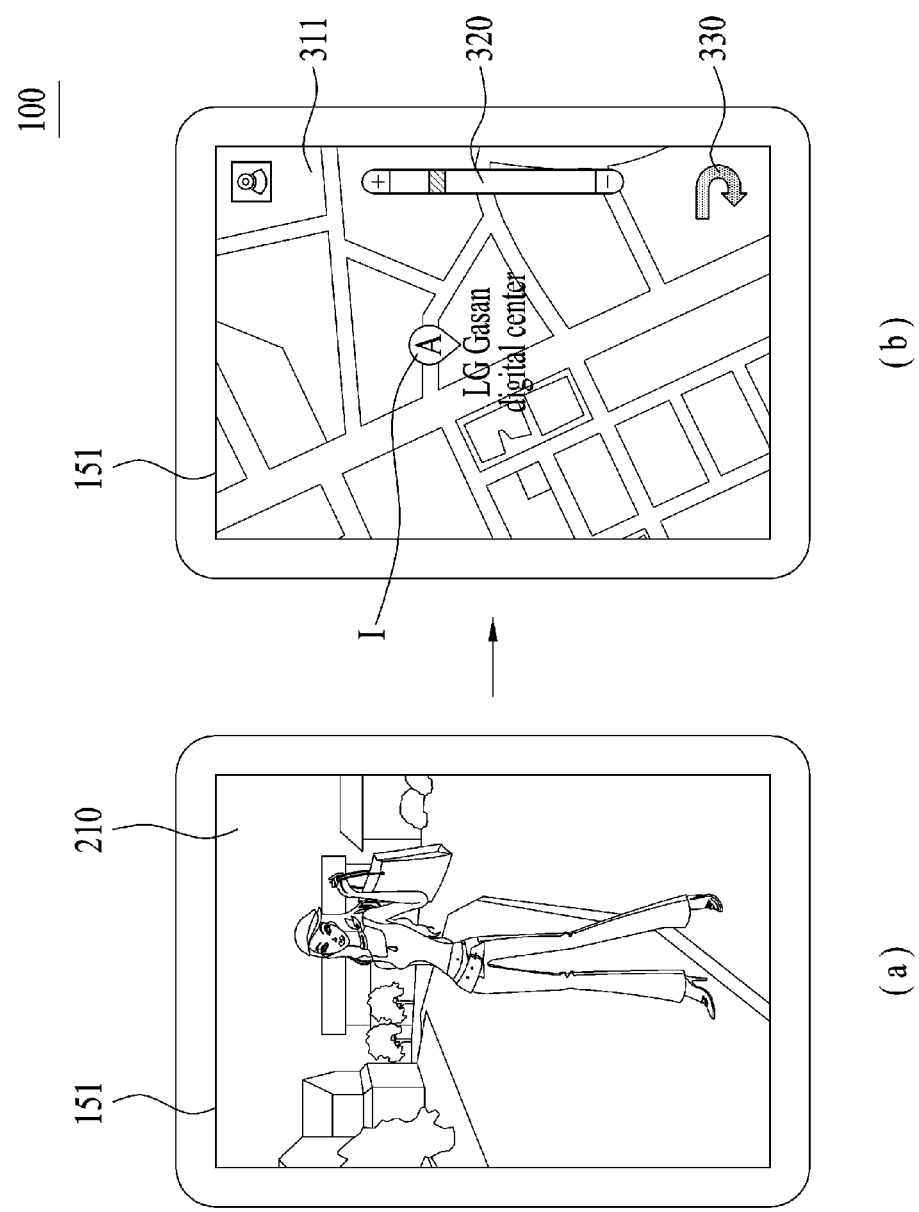
FIG. 4 is a diagram for an example of a screen displayed in a display of a mobile terminal according to one embodiment of the present invention.

FIG. 4 is a diagram for an example of a screen displayed in a display of a mobile terminal according to one embodiment of the present invention.

Referring to FIG. 4 (a), a first image 210 is displayed in the display 151 of the mobile terminal 100. The first image 210 may correspond to a preview image captured by the camera 121 or an image captured by the camera 121 and stored in the memory 161 in a file form.

The position-location module 115 obtains location information of the mobile terminal 100 when the first image 210 is captured and the memory 160 stores the obtained location information of the mobile terminal 100.

As depicted in FIG. 4 (b), when the first image 210 is displayed in the display 151 with a magnification satisfying a first condition, if a first command is detected, the controller 180 controls the display 151 to display a map 311 of a first range.

The magnification satisfying the first condition may include a predetermined lowest magnification of the first image 210 or a magnification capable of displaying the whole of the first image 210 in an area in which the first image 210 is displayable in the display 151. For instance, the magnification satisfying the first condition may correspond to a magnification for displaying the first image 210 in the display 151 in an original size or a magnification for displaying the first image 210 in the display 151 in a manner of reducing the first image 210 to the max.

The first command may be used for changing a magnification of the first image 210. For instance, the first command may be used for reducing the magnification of the first image 210. As an example, the first command may correspond to a zoom-out command of the first image 210. The zoom-out command of the first image 210 can be inputted in a manner that a user randomly touches two parts in the first image 210 and drags the two parts inside direction, respectively.

The map 311 of the first range includes a point corresponding to the location information of the mobile terminal 100 obtained by the position-location module 115 when the first image 210 is captured by the camera 121. The map 311 of the first range corresponds to a map including the point and a prescribed area in the vicinity of the point and has a predetermined scale.

When the first image 210 is displayed in the display 151 with a magnification unable to reduce the magnification any more or a predetermined lowest magnification, a user can input a first command to reduce the magnification of the first image 210 as an intuitive operation intending to see a wider range. In particular, the user intends to check a position in which the first image 210 is captured with the wider range by inputting the first command for reducing the magnification of the first image 210. According to the present embodiment, the user can easily check the position in which the first image 210 is captured via the map in a manner of simply inputting the intuitive first command.

The controller 180 can control the display 151 to display an indicator (I) indicating a position corresponding to location information of the mobile terminal 100 in the map 311 of the first range. By doing so, the user can more precisely recognize the position in which the first image 210 is captured on the map 311 of the first range.

The user may change a scale of a map via a configuration bar 320 displayed in the map 311 of the first range or may expand/reduce a range of an area displayed in a screen of the display 151 via the configuration bar 320.

The display 151 can display a return menu 330 in a state that the map 311 of the first range is displayed.

If a return command is received via the return menu 330, the controller 180 controls the display 151 to display the first image 210 depicted in FIG. 4 (a) again.

Meanwhile, the user may intend to check the position in which the first image 210 is captured on a map including a range wider than the range of the map 311 of the first range. Regarding this, it shall be described with reference to FIG. 5.

Figure 5:
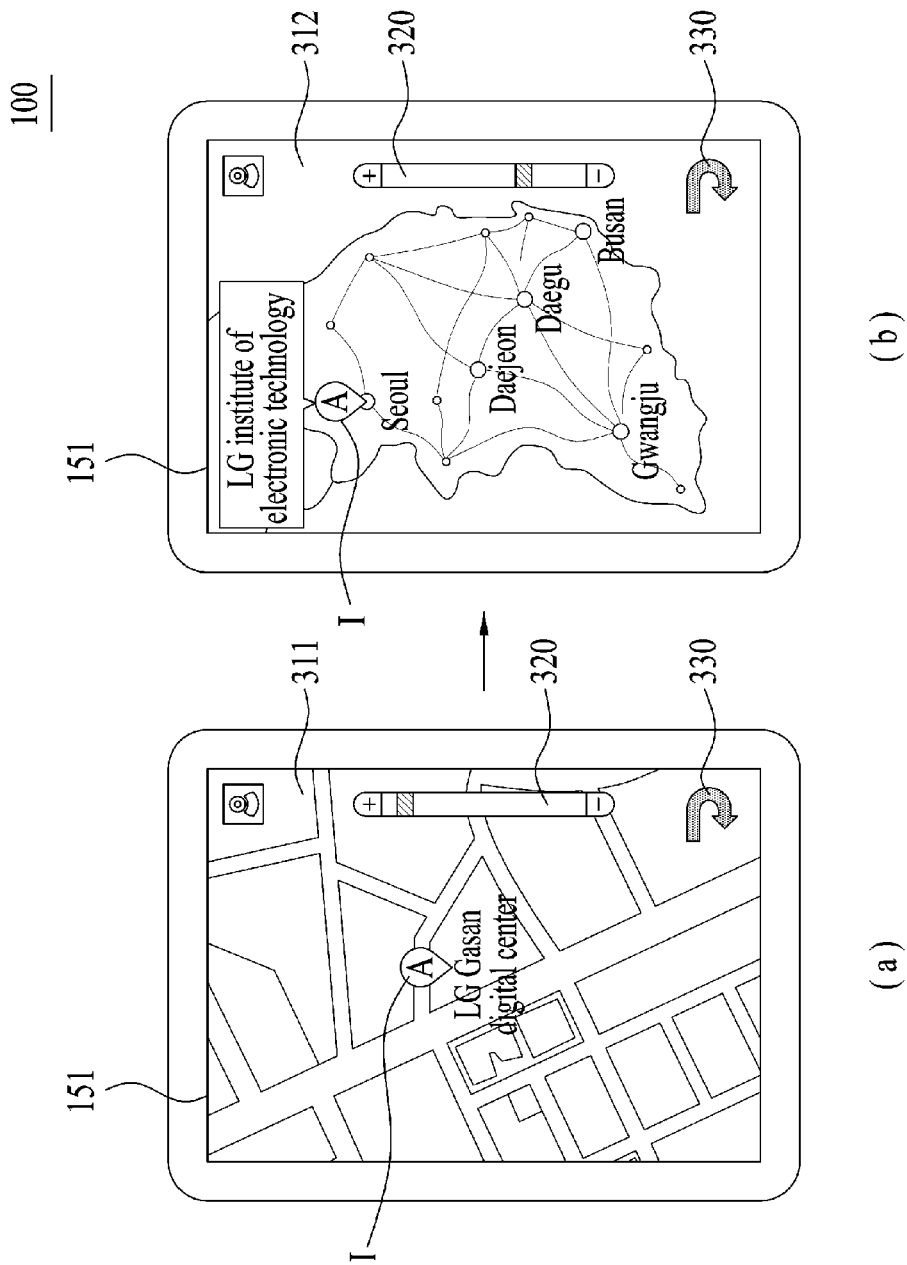
FIG. 5 is a diagram for an example of a screen displayed in a display of a mobile terminal according to one embodiment of the present invention.

FIG. 5 is a diagram for an example of a screen displayed in a display of a mobile terminal according to one embodiment of the present invention.

Referring to FIG. 5 (a), the map 311 of the first range is displayed in the display 151 of the mobile terminal 100. The first image 210 may correspond to a preview image captured by the camera 121 or an image captured by the camera 121 and stored in the memory 161 in a file form.

As mentioned in the foregoing description in relation to FIG. 4, if the first command is detected, the controller 180 outputs the map 311 of the first range in the display 151. An indicator (I), which indicates a point corresponding to location information of the mobile terminal 100 when the first image 210 is captured by the camera 121, can be displayed in the map 311 of the first range.

As depicted in FIG. 5 (b), when the map 311 of the first range is displayed in the display 151, if a second command is detected, the controller 180 controls the display 151 to display a map 312 of a second range.

The second command may be used for changing a magnification of the map 311 of the first range or a scale of the map 311 of the first range. For instance, the second command may be used for reducing the magnification of the map 311 of the first range or the scale of the map 311 of the first range. As an example, the second command may correspond to a zoom-out command of the map 311 of the first range.

The zoom-out command of the map 311 of the first range can be inputted in a manner that a user randomly touches two parts in the map 311 of the first range and drags the two parts inside direction, respectively.

The map 312 of the second range includes a point corresponding to the location information of the mobile terminal 100 obtained by the position-location module 115 when the first image 210 is captured by the camera 121. The map 312 of the second range corresponds to a map including the point and a prescribed area in the vicinity of the point and has a predetermined scale. In this case, the map 312 of the second range is smaller than the map 311 of the first range in scale. Hence, since an area, which is relatively wider than the map 311 of the first range, is displayed in a manner of being relatively smaller than the map 311 of the first range, the map 312 of the second range shows an area of a wider range compared to the map 311 of the first range.

When the map 311 of the first range is displayed in the display 151, a user can input the second command to reduce a magnification of the map 311 of the first range or a scale of the map 311 of the first range as an intuitive operation intending to see a wider range. In particular, the user intends to check the position in which the first image 210 is captured in the map including an area of the wider range in a manner of inputting the second command used for reducing the magnification of the map 311 of the first range or the scale of the map 311 of the first range. Of course, the user can make the area of the wider range to be displayed in a screen via the configuration bar 320 displayed in the map 311 of the first range. Yet, according to the present embodiment, the user can easily check the position in which the first image 210 is captured in the map in which the area of the wider range is displayed by simply inputting the intuitive second command.

The display 151 can display a return menu 330 in a state that the map 312 of the second range is displayed.

If a return command is received via the return menu 330 depicted in FIG. 5 (b), the controller 180 controls the display 151 to display the first image 210 depicted in FIG. 4 (a) again. Or, if the return menu is received via the return menu 330 depicted in FIG. 5 (b), the controller 180 may control the display 151 to display the map 311 of the first range depicted in FIG. 5 (a) corresponding to a previous screen.

Meanwhile, the first image 210 can be displayed together with a map including the position in which the first image 210 is captured. Regarding this, it shall be explained with reference to FIG. 6.

Figure 6:
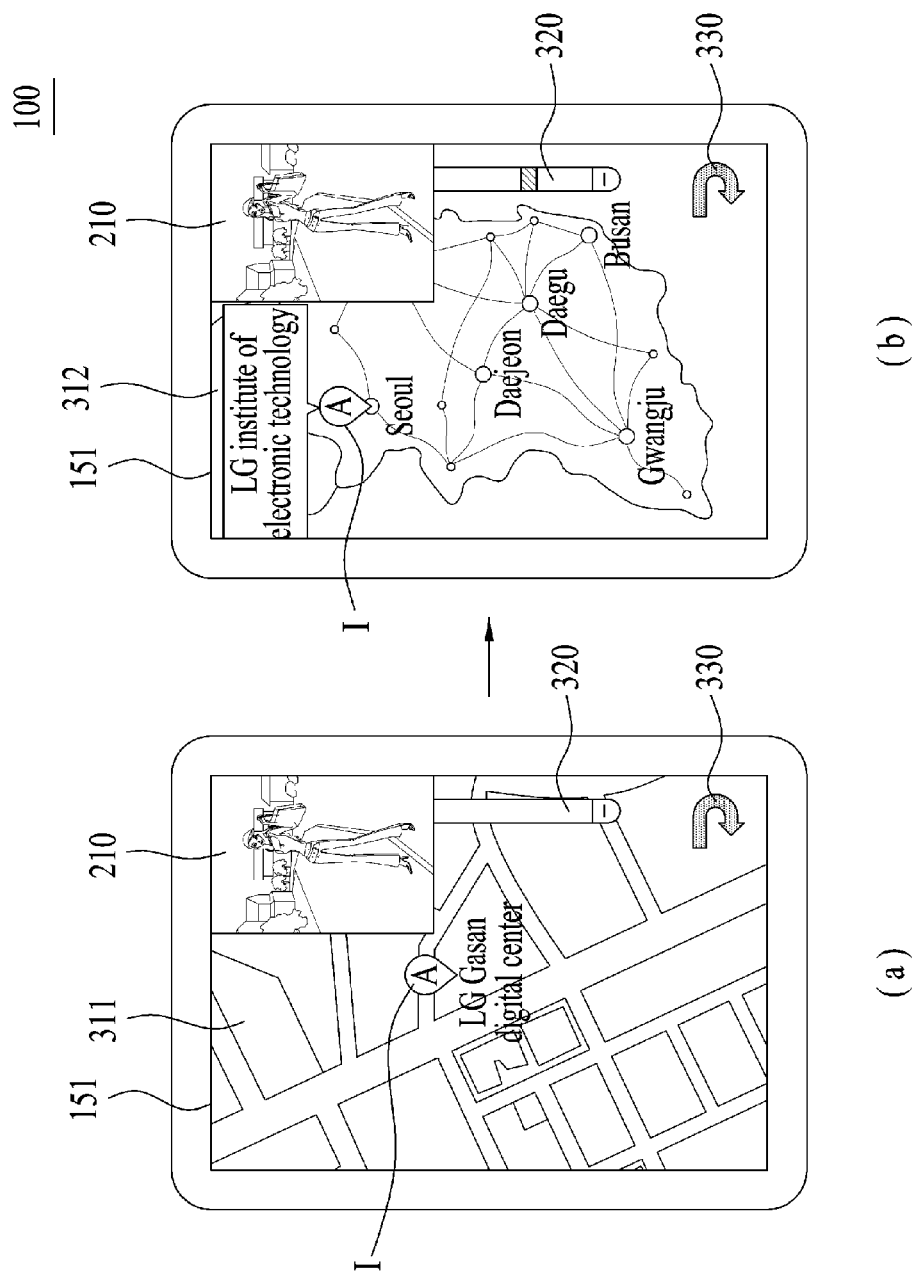
FIG. 6 is a diagram for an example of a screen displayed in a display of a mobile terminal according to one embodiment of the present invention.

FIG. 6 is a diagram for an example of a screen displayed in a display of a mobile terminal according to one embodiment of the present invention.

Referring to FIG. 6 (a), the display 151 of the mobile terminal 100 can display the map 311 of the first range and the first image 210 in one screen. Since the map 311 of the first range is mentioned earlier with reference to FIG. 4, detailed explanation on the map 311 of the first range is omitted at this time. Similarly, referring to FIG. 6 (b), the display 151 of the mobile terminal 100 can display the map 312 of the second range and the first image 210 in one screen. Since the map 312 of the first range is mentioned earlier with reference to FIG. 5, detailed explanation on the map 312 of the first range is omitted at this time. In this case, the first image 210 is displayed in a state that a magnification of the first image is changed by the first command. For instance, the first image 210 is displayed in a state that the magnification of the first image is reduced by the first command.

According to the present embodiment, a user can check the first image 210 and a position in which the first image 210 is captured in one screen, thereby enhancing user convenience.

The first image 210 can move to a different position on the map 311 of the first range or the map 312 of the second range in a manner that the user touches and drags a random area of the first image 210. And, a size of the first image 210 can be adjusted in a manner that the user randomly touches a part of an edge frame of the first image 210 or two areas of the first image 210 and drags the areas in and out.

If a touch command for touching the first image 210 is detected, the controller 180 can control the display 151 to display the first image 210 depicted in FIG. 4 (a) again.

Meanwhile, in the middle of switching a screen from the first image 210 to the map 311 of the first range, the first image 210 can be displayed in a manner of being overlaid with the map 311 of the first range. Regarding this, it shall be described with reference to FIG. 7.

Figure 7:
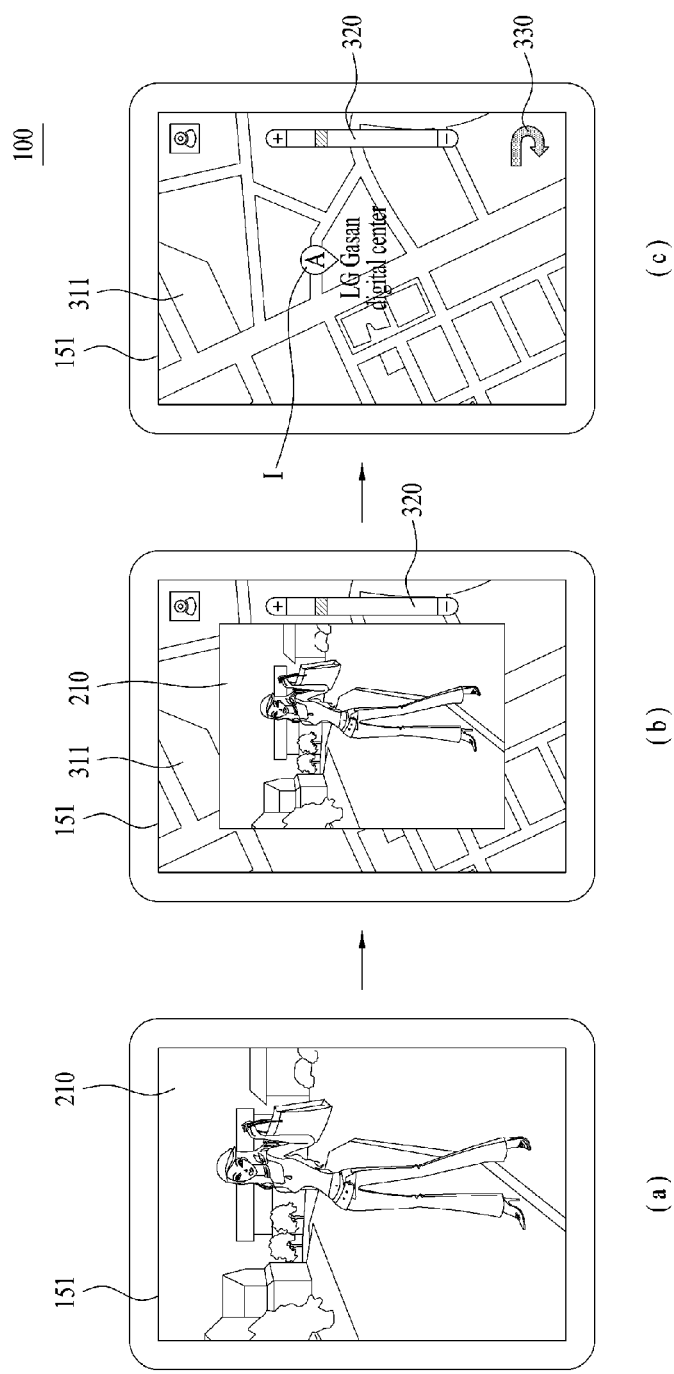
FIG. 7 is a diagram for an example of a screen displayed in a display of a mobile terminal according to one embodiment of the present invention.

FIG. 7 is a diagram for an example of a screen displayed in a display of a mobile terminal according to one embodiment of the present invention.

Referring to FIG. 7 (a), the first image 210 is displayed in the display 151 of the mobile terminal 100. The first image 210 may correspond to a preview image captured by the camera 121 or an image captured by the camera 121 and stored in the memory 161 in a file form.

As depicted in FIG. 7 (c), when the first image 210 is displayed in the display 151 with a magnification satisfying a first condition, if a first command is detected, the controller 180 controls the display 151 to display the map 311 of the first range. In this case, as depicted in FIG. 7 (b), the controller 180 can control the display 151 to display the first image 210 in a manner of overlaying the map 311 of the first range with the first image 210 in the middle of switching a screen of the display 151 from the first image 210 to the map 311 of the first range.

In other word, if the first command is detected, the controller 180 displays the map 311 of the first range in the screen of the display 151 while the first image 210 is displayed in the map 311 of the first range in a manner of overlaying the map 311 of the first range with the first image 210. The first image 210 overlaying the map 311 of the first range with the first image is displayed in the display 151 with a magnification lower than a magnification of the first image 210 displayed in FIG. 7 (a). And, the magnification of the first image 210 is gradually reduced and the screen of the display 151 can be completely switched to the map 311 of the first range as depicted in FIG. 7 (c).

According to the present embodiment, a user can more intuitively recognize the step-by-step process of switching the screen of the display 151 switched from the first image 210 to the map 311 of the first range according to the first command.

According to the present invention, along with a position in which the first image is captured currently displayed in the screen of the display 151, positions in which prestored images are captured can also be checked at a glance. Regarding this, it shall be explained with reference to FIG. 8 to FIG. 10.

Figure 8:
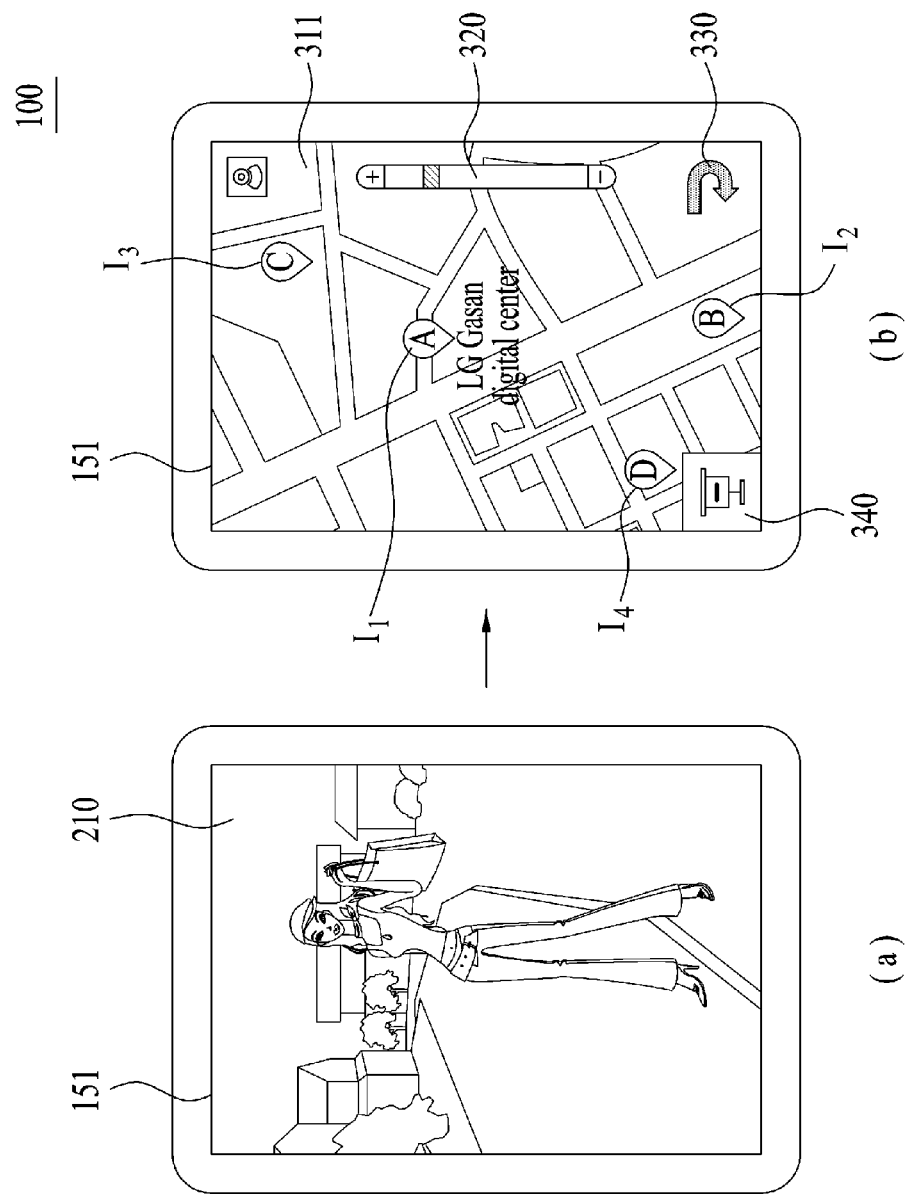
FIG. 8 is a diagram for an example of a screen displayed in a display of a mobile terminal according to one embodiment of the present invention.

FIG. 8 is a diagram for an example of a screen displayed in a display of a mobile terminal according to one embodiment of the present invention.

Referring to FIG. 8 (a), the first image 210 is displayed in the display 151 of the mobile terminal 100. The first image 210 may correspond to a preview image captured by the camera 121 or an image captured by the camera 121 and stored in the memory 161 in a file form.

The memory 160 further stores a plurality of pre-obtained images except the first image 210. The memory 160 stores location information of the mobile terminal 100 in a manner of matching the location information of the mobile terminal with each of a plurality of the pre-obtained images when each of a plurality of the pre-obtained images is captured.

As depicted in FIG. 8 (b), when the first image 210 is displayed in the display 151 with a magnification satisfying a first condition, if a first command is detected, the controller 180 controls the display 151 to display the map 311 of the first range. As mentioned in the foregoing description, the map 311 of the first range includes a point corresponding to the location information of the mobile terminal 100 obtained by the position-location module 115 when the first image 210 is captured by the camera 121. The map 311 of the first range corresponds to a map including the point and a prescribed area in the vicinity of the point and has a predetermined scale.

The controller controls the display 151 to display an indicator (I1) indicating the point corresponding to the location information of the mobile terminal 100 when the first image 210 is captured in the map 311 of the first range.

If the first command is detected, the controller 180 controls the display 151 to display at least one indicator indicating each of points included in the map 311 of the first range among points corresponding to the location information stored in the memory in a manner of being matched with a plurality of the pre-obtained images, respectively.

For instance, assume that pre-obtained 10 more images are stored in the memory 1610 except the first image 210 and 3 images among the 10 pre-stored images are captured in a position included in the map 311 of the first range. For clarity, the 3 images are named a second image, a third image, and a fourth image, respectively. In particular, the second image, the third image, and the fourth image are captured in the vicinity of the position in which the first image 210 is captured.

If the first command is detected, the controller 180 outputs the map 311 of the first range in the display 151. At the same time, the controller 180 can control the display 151 to display a first indicator (I1) indicating a point corresponding to the location information of the mobile terminal 100 when the first image 210 is captured, a second indicator (I2) indicating a point corresponding to the location information of the mobile terminal 100 when the second image is captured, a third indicator (I3) indicating a point corresponding to the location information of the mobile terminal 100 when the third image is captured, and a fourth indicator (I4) indicating a point corresponding to the location information of the mobile terminal 100 when the fourth image is captured in the map 311 of the first range.

According to the present invention, a user can identify whether there exist pictures captured in the vicinity of the position in which the first image 210 is captured among the pictures stored in the memory 160 and positions in which the pictures captured in the vicinity of the position in which the first image 210 is captured at a glance.

Meanwhile, display 151 may display a picture view menu 340 in a state that the map 311 of the first range is displayed.

If a picture view command is received via the picture view menu 340, the controller 180 can control the display 151 to display images respectively corresponding to the indicators displayed in the map 311 of the first range. Regarding this, it shall be described with reference to FIG. 9 and FIG. 10.

Figure 9:
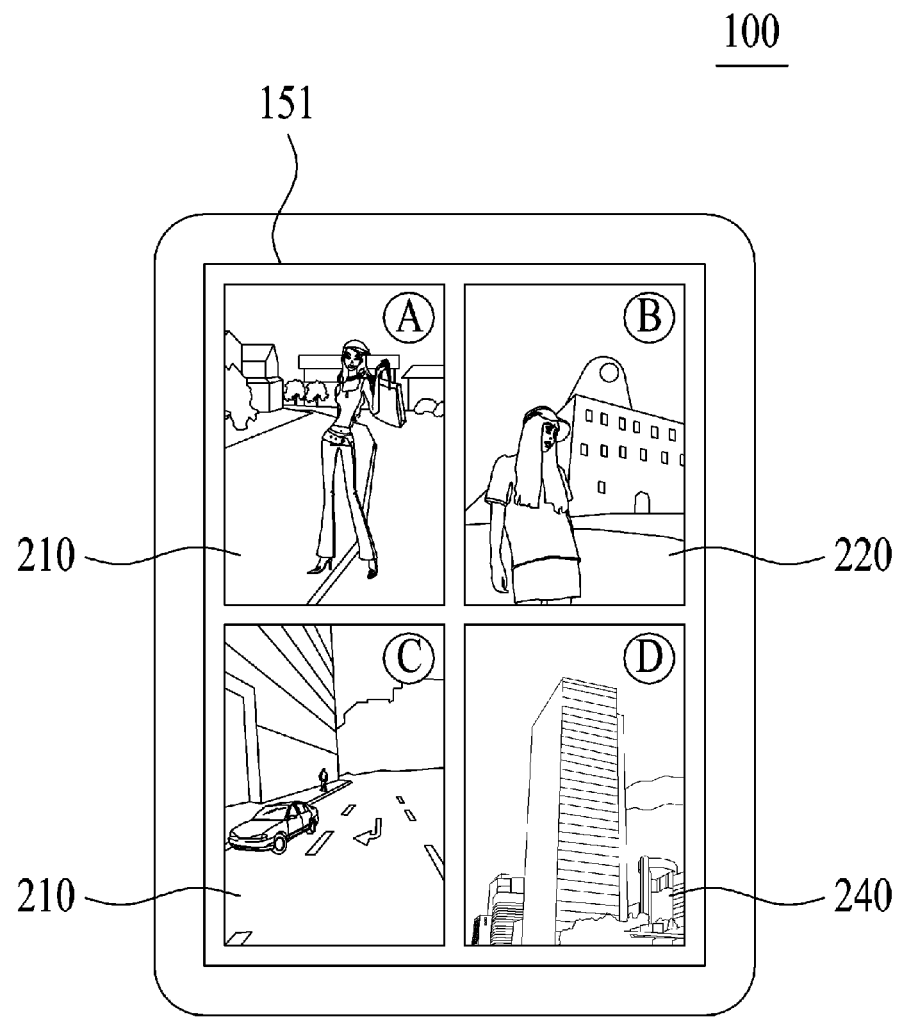
FIG. 9 and FIG. 10 are diagrams for examples of a screen displayed in a display of a mobile terminal according to one embodiment of the present invention.
Figure 10:
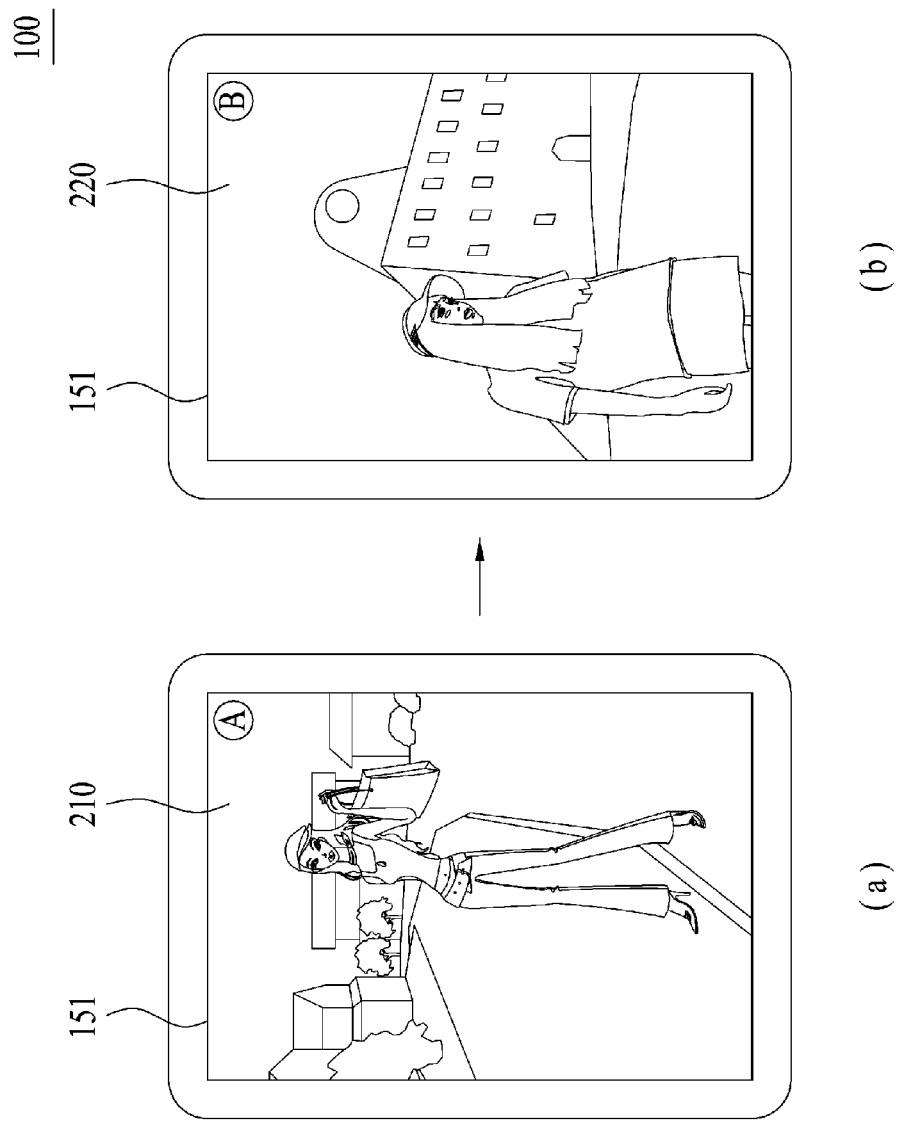

FIG. 9 and FIG. 10 are diagrams for examples of a screen displayed in a display of a mobile terminal according to one embodiment of the present invention.

If the picture view command is detected, the controller 180 controls the display 151 to display images respectively corresponding to the points indicated by the indicators, which are displayed in the map 311 of the first range, among a plurality of the pre-obtained images and the first image 210.

As depicted in FIG. 8, assume that 10 more pre-obtained images are stored in the memory 160 except the first image 210 and 3 images of the 10 images are captured in a position included in the map 311 of the first range. For clarity, the 3 images are named a second image 220, a third image 230, and a fourth image 240, respectively.

If the picture view command is detected, the controller 180 can control the display 151 to display the first image 210 to the fourth image 240 respectively corresponding to the indicators (I1~I4) displayed in the map 311 of the first range. A first indicator (I1), a second indicator (I2), a third indicator (I3), and a fourth indicator (I4) correspond to the first image 210, the second image, 220, the third image 230, and the fourth image 240, respectively.

As an example, as depicted in FIG. 9, the controller 180 can control the display 151 to display the first image 210 to the fourth image 240 in a form of thumbnail images.

As a different example, as depicted in FIG. 10, the controller 180 may display the first image 210 to the fourth image 240 in a form of a slideshow. To display the images in the form of the slideshow can be defined as displaying the images one by one in a screen of the display 151. In some cases, the first image 210 to the fourth image 240 can be displayed by a scheme that the images are automatically switched from one image to a different image in every predetermined time interval or a scheme that the images are switched from one image to a different image by a screen touch and a flicking operation of a user.

Although FIG. 8 to FIG. 10 are explained in relation to the map 311 of the first range, it is apparent to those having ordinary skill in the art that the aforementioned content can also be similarly applied when the map 311 of the first range is changed to the map 312 of the second range. Hence, explanation on content associated with the map 312 of the second range is omitted at this time.

According to the present invention, information on a preview image or information on an image stored in the memory can be checked in an intuitive manner. Regarding this, it shall be described with reference to FIG. 11 and FIG. 12.

Figure 11:
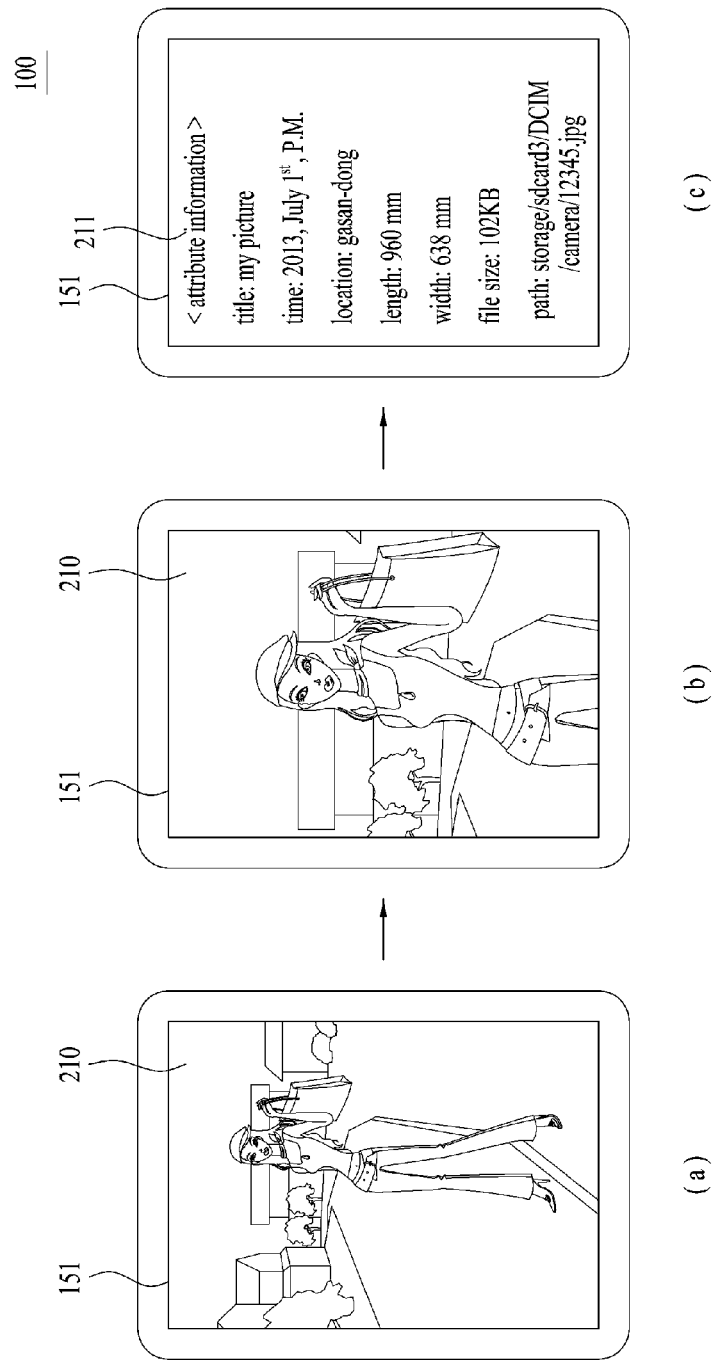
FIG. 11 and FIG. 12 are diagrams for an example of a screen displayed in a display of a mobile terminal according to one embodiment of the present invention.
Figure 12:
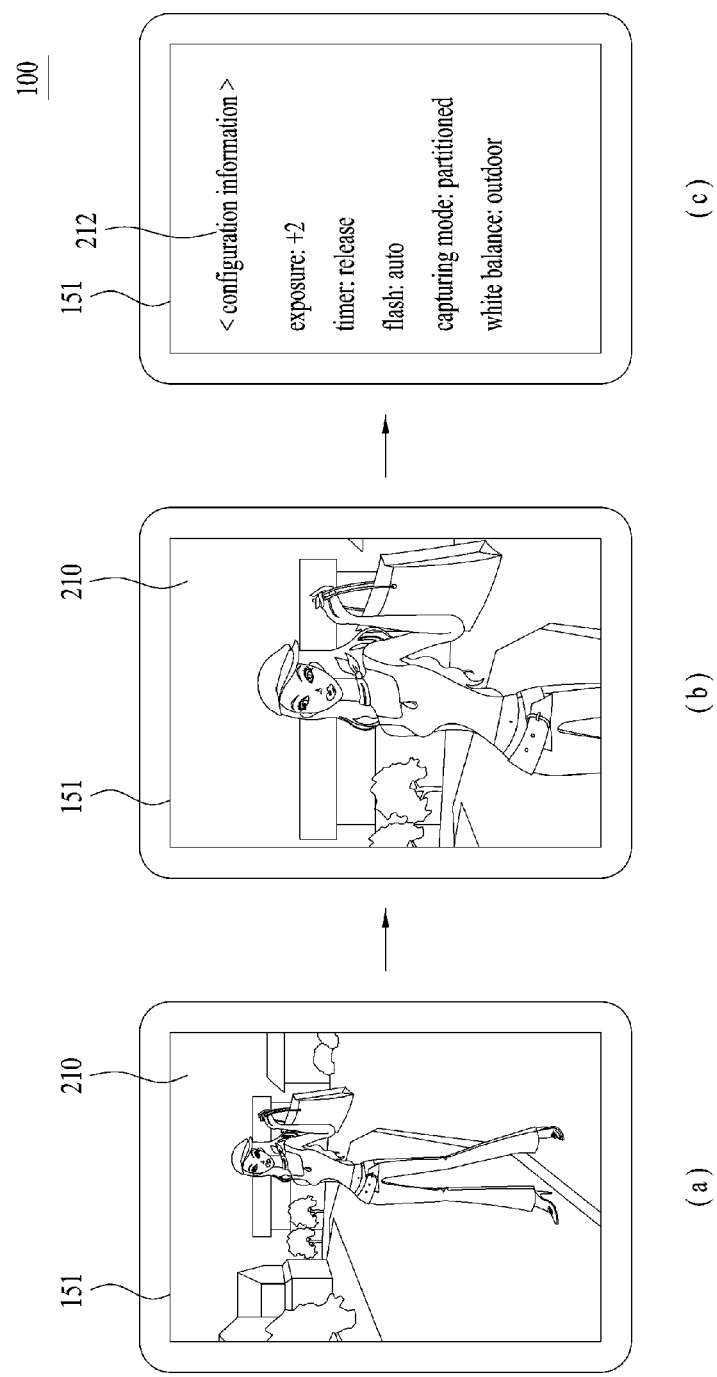

FIG. 11 and FIG. 12 are diagrams for an example of a screen displayed in a display of a mobile terminal according to one embodiment of the present invention.

Referring to FIG. 11 (a), the first image 210 is displayed in the display 151 of the mobile terminal 100. The first image 210 may correspond to an image captured by the camera 121 and stored in the memory 160 in a file form.

As depicted in FIG. 11 (c), when the first image 210 is displayed in the display 151 with a magnification satisfying a second condition, if a third command for enlarging the magnification of the first image 210 is detected, the controller 180 controls the display 151 to display information on the first image 210. As an example, the third command may correspond to a zoom-in command of the first image 210. For instance, the zoom-in command of the first image 210 can be inputted in a manner that a user randomly touches two parts in the first image 210 and drags the two parts outside direction, respectively.

The magnification satisfying the second condition may include a predetermined highest magnification of the first image 210 or a magnification capable of displaying a smallest area of the first image 210 in an area in which the first image 210 is displayable in the display 151. For instance, the magnification satisfying the second condition may correspond to the magnification enabling a part of the first image 210 to be displayed in a screen of the display 151 only in a manner of magnifying the first image 210 to the max and displaying the first image in the display 151.

As depicted in FIG. 11 (b), when the first image 210 is displayed in the display 151 with a magnification not satisfying the second condition, if a third command for enlarging the magnification of the first image 210 is detected, the controller 180 displays the first image 210 in a manner of enlarging the magnification of the first image in response to the third command.

Hence, if a user inputs the third command for enlarging the magnification of the first image 210 for plural times, as depicted in FIG. 11 (b), the first image is displayed in the display 151 in a manner that the magnification of the first image 210 is gradually enlarged. As depicted in FIG. 11 (c), when the first image 210 is displayed in the display 151 with the magnification satisfying the second condition, if the user inputs the third command, information on the first image 210 can be displayed in the display 151.

Since the first image 210 is an image captured by a picture capturing command and stored in the memory 160 in a file form, the information 211 on the first image 210 may correspond to attribute information of the image. For instance, the information 211 on the first image 210 may include a title of the first image 210, a time/location in which the first image 210 is captured, a size of the first image 210 in width and the like, a file size of the first image 210, a storage route of the first image 210, and the like.

Meanwhile, if the first image corresponds to a preview image, information 212 on the first image 210 can be displayed as depicted in FIG. 12 (c). The information 212 on the first image 210 may correspond to configuration information of the camera 121 when the first image 210 is captured. For instance, the information 212 on the first image 210 may include an exposure value of the camera 121, whether a timer is set, whether a flash is set, a capturing mode, a white balance configuration value, and the like.

When the first image 210 is displayed in the display 151 with a magnification unable to enlarge the magnification any more or a predetermined highest magnification, a user can input a third command to enlarge the magnification of the first image 210 as an intuitive operation intending to see a detail. According to the present embodiment, the user can easily check the information on the first image 210 by simply inputting the intuitive third command.

In the foregoing description, embodiments for checking the capturing position of the first image 210 or the information on the first image 210 are described. In the following, as a different embodiment of the present invention, methods for taking a picture in a virtual place are explained with reference to FIG. 13 and FIG. 14.

Figure 13:
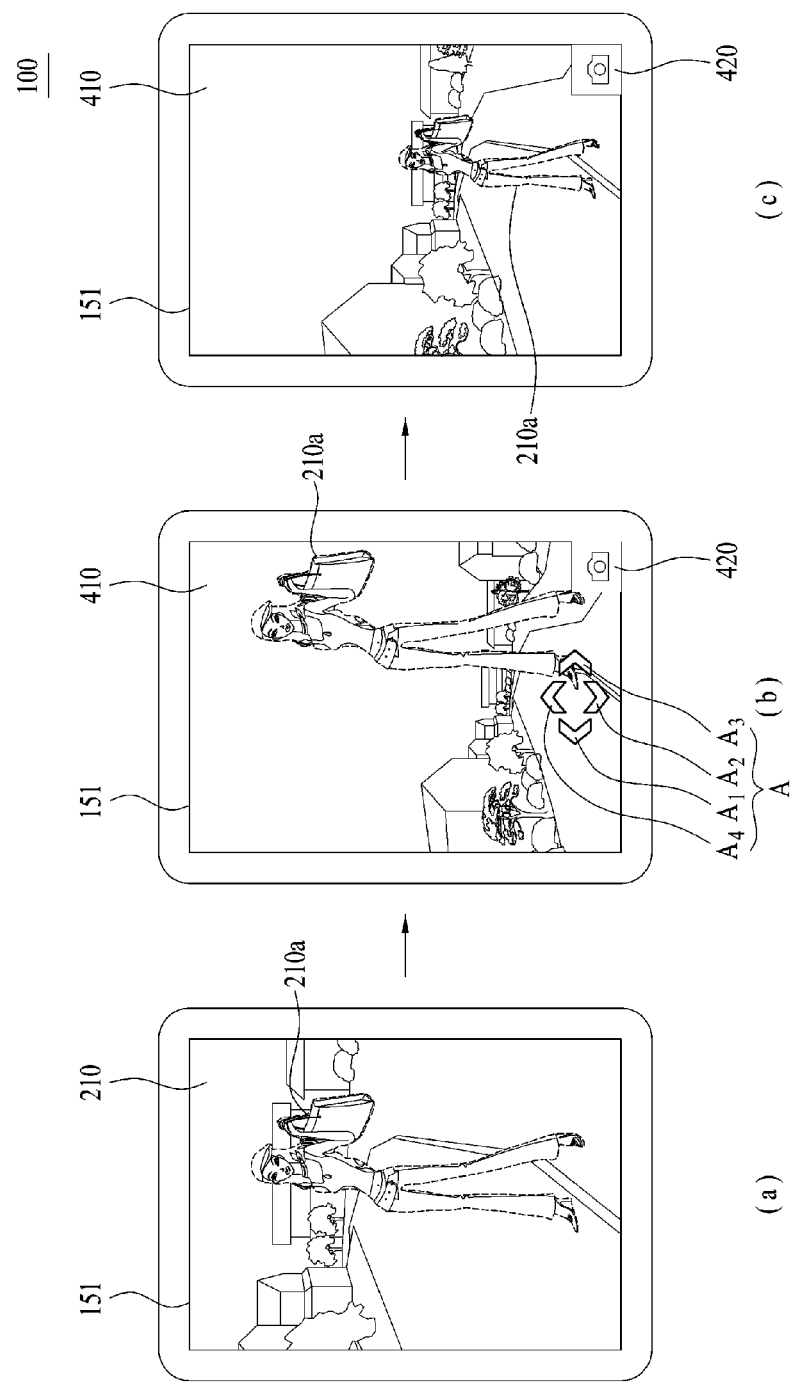
FIG. 13 is a diagram for an example of a screen displayed in a display of a mobile terminal according to a different embodiment of the present invention.

FIG. 13 is a diagram for an example of a screen displayed in a display of a mobile terminal according to a different embodiment of the present invention.

Referring to FIG. 13 (a), the first image 210 is displayed in the display 151 of the mobile terminal 100. The first image 210 may correspond to a preview image captured by the camera 121 or an image captured by the camera 121 and stored in the memory 161 in a file form.

The position-location module 115 obtains location information of the mobile terminal 100 when the first image 210 is captured and the memory 160 stores the obtained location information of the mobile terminal 100.

And, the memory 160 stores map information. The map information includes a road view image. In particular, the map information may further include a road view image corresponding to an image in which an actual road is taken as well as a general map image displaying a part or a whole of the surface of earth using a sign or a character by scaling it down with a prescribed ratio.

If a specific command is detected, the controller 180 can control the display 151 to extract an object 210a from the first image 210 and display a road view image 410 corresponding to the location information of the mobile terminal 100 when the first image 210 is captured as well as the extracted object 210a.

The specific command may be used for changing magnification of the first image 210, by which the present invention may be non-limited. For instance, the specific command may be used for reducing the magnification of the first image 210. As an example, the specific command may correspond to a zoom-out command of the first image 210. The zoom-out command of the first image 210 can be inputted in a manner that a user randomly touches two parts in the first image 210 and drags the two parts inside direction, respectively.

In other word, as depicted in FIG. 13 (a), the controller 180 can extract an object 210a from the first image 210. The object may correspond to a person becoming a capturing target. However, the object is not necessarily to be a person. The object may correspond to a specific thing carried by the person, a specific object connected with the person, or the like. If the first image 210 corresponds to a preview image, the controller 180 may extract an area on which a focus is taken or a part corresponding to an area touched by a user from the preview image as an object.

And, the controller 180 accesses the memory 160 and may be then able to extract a road view image 410 corresponding to the location information of the mobile terminal 100 when the first image 210 is captured from the map information stored in the memory 160. As depicted in FIG. 13 (b), the controller 180 controls the display 151 to display the road view image 410 corresponding to the location information of the mobile terminal 100 and the object 210a.

The object 210a is displayed in the road view image 410 in a manner of being overlaid with the road view image 410. The object 210a can move to a different position in the road view image 410 in a manner that a user touches and drags a random area in the object 210a. And, a size of the object 210a can be adjusted in a manner that the user randomly touches an area of an edge frame of the object 210a or two areas of the object 210a and drags the areas in and out, respectively.

The user can store a screen, i.e., the road view image 410 and the object 210a, displayed in the display 151 as a computer file by capturing the screen in a manner that the user selects a picture capturing menu 420 depicted in FIG. 13 (b).

In some cases, the road view image 410 depicted in FIG. 13 (b) may be narrower or wider than a background area of a range preferred by the user. Or, the road view image may correspond to a road view image of a position different from a position in which the user intends to take a picture. Hence, the controller 180 can display an indicator (A) in the road view image 410 to receive a command for selecting a road view image of a specific direction among the road view image 410 corresponding to the location information of the mobile terminal 100 when the first image 210 is captured.

The indicator (A) may correspond to one or more arrows indicating specific directions, respectively. For instance, a user may select a left arrow (A1) to select a road view image of a left direction from the road view image 410 depicted in FIG. 13 (b) and may select an upper arrow (A4) to select a road view image, which is enlarged form of the road view image 410 depicted in FIG. 13 (b). For instance, in the latter case, as depicted in FIG. 13 (c), the controller 180 can control the display 151 to display the road view image 410 corresponding to the selected upper direction, i.e., the enlarged form of the road view image depicted in FIG. 13 (b). In this case, the object 210a is displayed in a manner of overlaying the enlarged road view image 410.

The user can store a screen, i.e., the enlarged road view image 410 and the object 210a, displayed in the display 151 as a computer file by capturing the screen in a manner that the user selects a picture capturing menu 420 depicted in FIG. 13 (c).

In case that a user takes a picture using the camera 121, it is possible to zoom in a camera lens but it is impossible to zoom out the camera lens. Hence, the user should move backward while carrying the mobile terminal 100 to make the camera 121 to be apart from a subject in order for the user capture an area of a more wider range as a background of a picture. According the present embodiment, since it is possible for the user to put the object 210a on the road view image 410 corresponding to the location information of the mobile terminal 100 when the first image is captured, the user can capture an area of a more wider range as a background of a picture without restriction of a place and distance. Moreover, since the user can take a picture in a virtual place, it may arouse user's interest.

Meanwhile, after loading a road view image in a state that the map 311 of the first range or the map 312 of the second range is displayed in the display 151, the user can take a picture in a virtual place. Regarding this, it shall be described with reference to FIG. 14.

Figure 14:
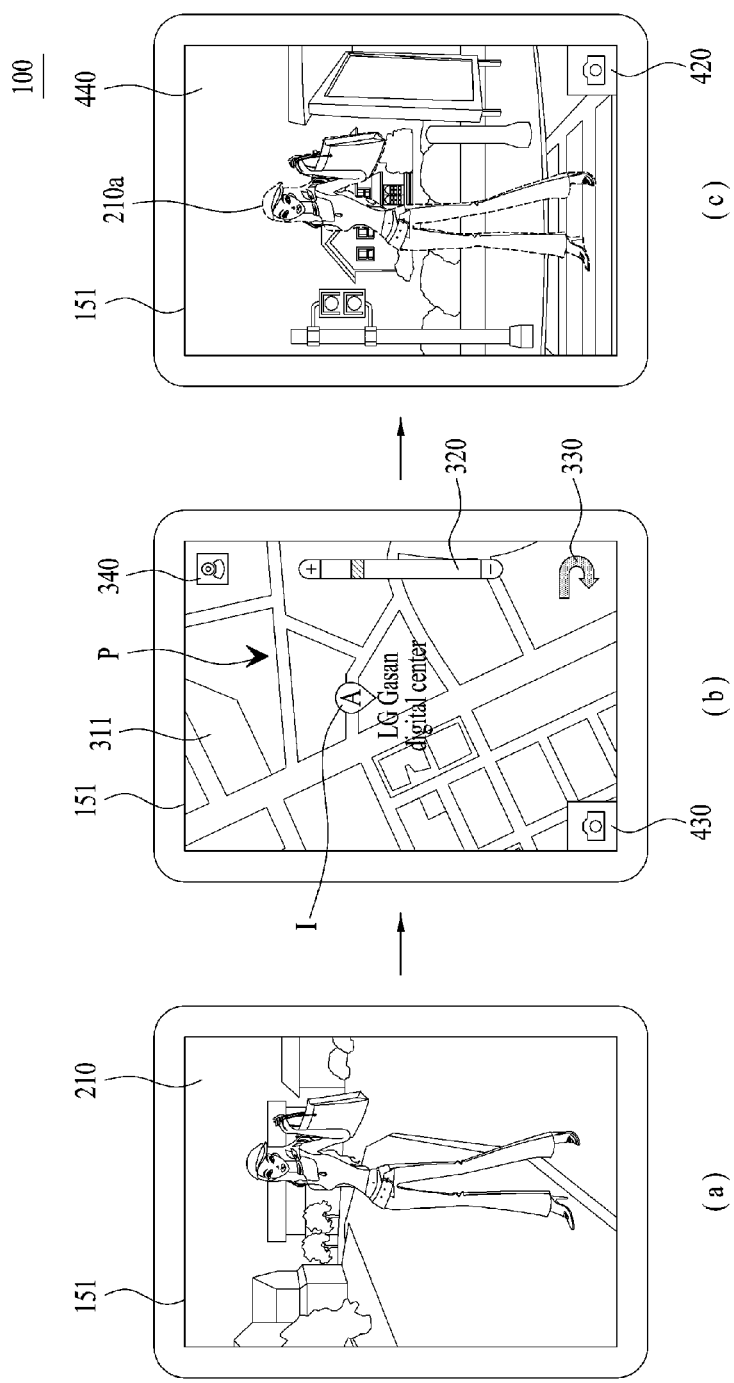
FIG. 14 is a diagram for an example of a screen displayed in a display of a mobile terminal according to a different embodiment of the present invention.

FIG. 14 is a diagram for an example of a screen displayed in a display of a mobile terminal according to a different embodiment of the present invention.

Referring to FIG. 14 (a), the first image 210 is displayed in the display 151 of the mobile terminal 100. The first image 210 may correspond to a preview image captured by the camera 121 or an image captured by the camera 121 and stored in the memory 161 in a file form.

The position-location module 115 obtains location information of the mobile terminal 100 when the first image 210 is captured and the memory 160 stores the obtained location information of the mobile terminal 100.

As depicted in FIG. 14 (b), when the first image 210 is displayed in the display 151 with a magnification satisfying a first condition, if a first command is detected, the controller 180 can control the display 151 to display the map 311 of the first range. Since the magnification satisfying the first condition and the first command are explained in the foregoing description with reference to FIG. 4, explanation on the magnification satisfying the first condition and the first command is omitted at this time.

A user selects a road view menu 340 included in the map 311 of the first range. If the road view menu 340 is selected, a pointer (P) can be displayed in a screen of the display 151. The user places the pointer (P) on a preferred random point of the map 311 of the first range and may be then able to select a picture capturing menu 430. Yet, selection of the road view menu 340, display of the pointer (P) and/or selection of the picture capturing menu 430 are just one example only, by which the present invention may be non-limited.

If a picture capturing command via the picture capturing menu 430 is detected, the controller 180 extracts an object 210a from the first image 210. And, as depicted in FIG. 14 (c), the controller 180 controls the display 151 to display a road view image 440 corresponding to a point indicated by the extracted object 210a and the pointer (P).

The user can store a screen, i.e., the road view image 440 and the object 210a, displayed in the display 151 as a computer file by capturing the screen in a manner that the user selects a picture capturing menu 420 depicted in FIG. 14 (c).

Although it is not depicted in FIG. 14 (c), the indicator (A) mentioned earlier with reference to FIG. 13 can also be displayed in the road view image 440.

Although FIG. 14 is explained in relation to the map 311 of the first range, it is apparent to those having ordinary skill in the art that the aforementioned content can also be similarly applied when the map 311 of the first range is changed to the map 312 of the second range. Hence, explanation on content associated with the map 312 of the second range is omitted at this time.

Figure 15:
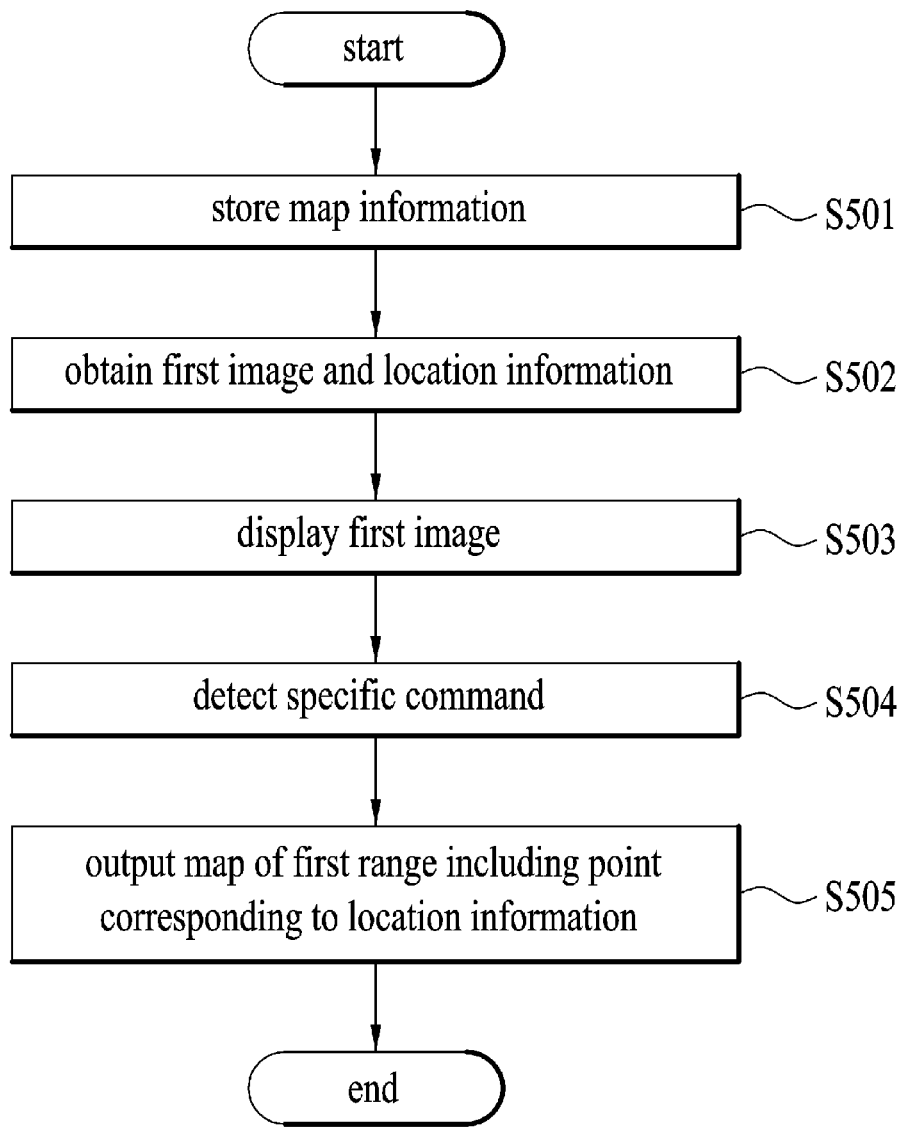
FIG. 15 is a flowchart for an example of a method of controlling a mobile terminal according to one embodiment of the present invention.

FIG. 15 is a flowchart for an example of a method of controlling a mobile terminal according to one embodiment of the present invention.

Referring to FIG. 15, the memory 160 of the mobile terminal 100 stores map information [S501]. The memory 160 may store a map associated program or an application received from an external server via the mobile communication module 112 or the wireless internet module 113. The map information stored in the memory 160 may be updated periodically or according to a user selection.

Subsequently, the camera 121 of the mobile terminal 100 captures a first image and the position-location module 115 obtains location information of the mobile terminal 100 when the first image is captured [S502]. As an example, the position-location module 115 may correspond to a GPS module and the location information may correspond to a GPS latitude/longitude coordinate. The memory 160 stores the location information of the mobile terminal 100 obtained by the position-location module 115.

Subsequently, the display 151 of the mobile terminal 100 displays the first image [S503].

If a specific command is detected [S504], the controller 180 of the mobile terminal 100 controls the display 151 to display a map of a first range including a point corresponding to the location information of the mobile terminal 100 when the first image is captured.

Figure 16:
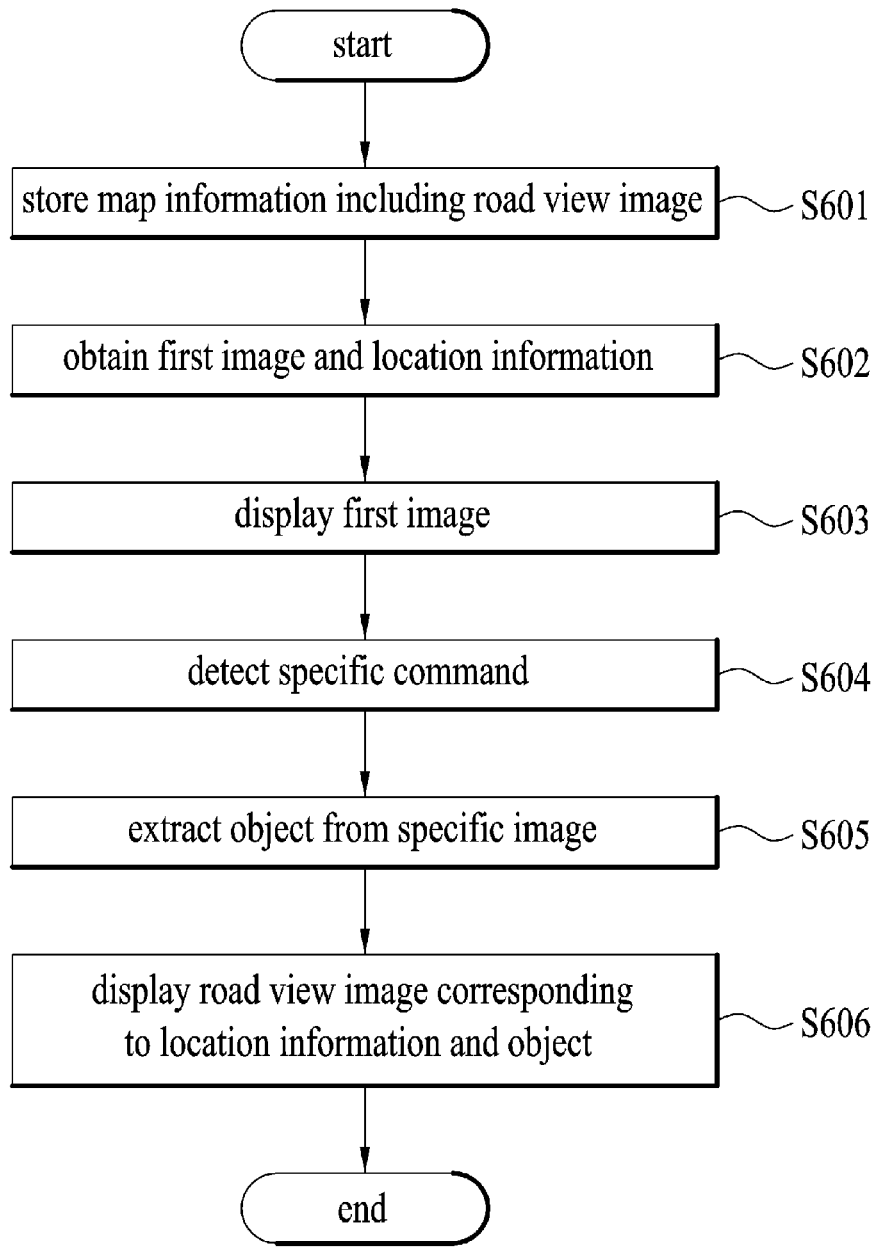
FIG. 16 is a flowchart for an example of a method of controlling a mobile terminal according to a different embodiment of the present invention.

FIG. 16 is a flowchart for an example of a method of controlling a mobile terminal according to a different embodiment of the present invention.

Referring to FIG. 16, the memory 160 of the mobile terminal 100 stores map information [S601]. The map information includes a road view image. In particular, the map information may further include a road view image corresponding to an image in which an actual road is taken as well as a general map image displaying a part or a whole of the surface of earth using a sign or a character by scaling it down with a prescribed ratio.

Subsequently, the camera 121 of the mobile terminal 100 captures a first image and the position-location module 115 obtains location information of the mobile terminal 100 when the first image is captured [S602]. Subsequently, the display 151 of the mobile terminal 100 displays the first image [S603].

If a specific command is detected [S604], the controller of the mobile terminal 100 extract an object from the first image [S605] and controls the display 151 to display a road view image corresponding to the location information of the mobile terminal 100 when the first image is captured and the extracted object. The object is displayed in the road view image in a manner of overlaying the road view image.

MODE FOR THE INVENTION

It will be apparent to those skilled in the art that the present invention can be specified into other form(s) without departing from the spirit or scope of the inventions.

The above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the control unit 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention relates to a mobile terminal and a method for controlling the same. Therefore, the present invention has industrial applicability.

The invention claimed is:

1. A mobile terminal, comprising:
a memory to store map information;
a camera to capture images;
a position-location module to obtain location information;
a display; and
a controller configured to:
cause the display to display a first image captured via the camera in a first magnification level;
cause the position-location module to obtain first location information corresponding to the first image when the first image is captured; and
cause the display to display a map of a first range containing a first point corresponding to the first location information in response to a first command for changing a magnification of the first image, the first command received while the first image is displayed in the first magnification level.

2. The mobile terminal of claim 1, wherein the first magnification level comprises a predetermined lowest magnification level.

3. The mobile terminal of claim 1, wherein the controller is further configured to cause the display to display a first indicator corresponding to the first location information in the displayed map of the first range.

4. The mobile terminal of claim 1, wherein:
the map of the first range is not displayed on the display prior to receiving the first command; and
the map of the first range and the first image are displayed together on the display after receiving the first command.

5. The mobile terminal of claim 4, wherein the controller is further configured to adjust the magnification of the first image while the map of the first range and the first image are displayed together.

6. The mobile terminal of claim 1, wherein the controller is further configured to:
cause the display to display a map of a second range containing the first point in response to receiving a second command.

7. The mobile terminal of claim 6, wherein the map of the first range is different from the map of the second range in scale.

8. The mobile terminal of claim 6, wherein the controller is further configured to cause the display to display a first indicator indicating the first point in the displayed map of the second range.

9. The mobile terminal of claim 1, wherein the controller is further configured to cause the display to:
display the first image in a second magnification level in response to receiving a second command for increasing the magnification of the first image; and
display information on the first image.

10. The mobile terminal of claim 9, wherein the second magnification level comprises a predetermined highest magnification level.

11. The mobile terminal of claim 9, wherein the first image corresponds to a preview image, and the information on the first image comprises configuration information of the camera.

12. The mobile terminal of claim 3, wherein the controller is further configured to cause the memory to store a plurality of pre-obtained second images and second location information corresponding to each of the plurality of second images.

13. The mobile terminal of claim 12, wherein the controller is further configured to:
cause the display to display at least one second indicator in addition to the first indicator in the map of the first range in response to receiving the first command, the at least one second indicator corresponding to the second location information corresponding to at least one of the plurality of second images that belongs to the map of the first range.

14. The mobile terminal of claim 13, wherein the controller is further configured to:
cause the display to no longer display the map of the first range and to display the first image and the at least one of the plurality of second images belonging to the map of the first range in response to receiving a second command.

15. The mobile terminal of claim 14, wherein the first image and the at least one of the plurality of second images belonging to the map of the first range are displayed as thumbnail images.

16. The mobile terminal of claim 14, wherein the first image and the at least one of the plurality of second images are displayed as images of a slideshow.

17. The mobile terminal of claim 1, wherein the first image comprises a preview image.

18. The mobile terminal of claim 1, wherein the first command corresponds to a zoom-out command of the first image.

19. A mobile terminal, comprising:
a memory to store map information containing a road view image;
a camera to capture a first images;
a position-location module to obtain location information;

a display; and a controller configured to:

cause the camera to capture a first image;

cause the display to display the first image;

cause the position-location module to obtain first location information corresponding to the first image; and cause the display to display an object extracted from the first image and a first road view image corresponding to the first location information in response to a first command for extracting the object from the first image such that the extracted object is overlaid on the road view image, the first command received while the first image is displayed.

20. The mobile terminal of claim 19, wherein the controller is further configured to:

cause the display to display the extracted object and a second road view image together in response to receiving a second command for selecting a specific direction from the displayed first road view image such that the extracted object is overlaid on the second road view image instead of the first road view image, the second road view image corresponding to second location information that is changed from the first location information according to the selected specific direction.

\* \* \* \* \*